Dec. 5, 1961  E. J. ROBINSON  3,012,183
FREQUENCY DOUBLER
Filed Dec. 24, 1959

EDWARD J. ROBINSON
INVENTOR.

BY Andrew L. Bain
George B. Auferoth

ATTORNEYS

United States Patent Office 3,012,183
Patented Dec. 5, 1961

3,012,183
FREQUENCY DOUBLER
Edward J. Robinson, Long Island City, N.Y., assignor to General Precision, Inc., a corporation of Delaware
Filed Dec. 24, 1959, Ser. No. 861,863
4 Claims. (Cl. 321—69)

The present invention relates to a frequency doubler, and more particularly to doubling a frequency by making use of the Hall effect.

It is well known that when a current I is passed through a crystal in a magnetic field B, a potential difference $V_H$ appears across the crystal. Or, an electric field $E_z$ is developed in the $z$ direction when a current of the density $I_x$ flows in the $x$ direction through a magnetic field $B_y$ in the $y$ direction. This potential difference is called the Hall voltage or $V_H$. The Hall effect, i.e., the production of the Hall voltage $V_H$ has heretofore been regarded as some sort of scientific curiosity. Little practical use has been found for this phenomenon. This may, to a large extent, be caused by the fact that fairly large magnets have been required to produce any amount of field; also, to get some appreciable effect, a semiconductor, e.g., a crystal is required to provide a drop in voltage across the magnetic field and such semiconductors have only recently been developed. However, although some attempts have been reported to make some practical use of the Hall effect, none, as far as I am aware was entirely successful when carried into practice commercially on an industrial scale, or in the construction of a frequency doubler.

It has now been discovered that the frequency of an electrical or electronic device, e.g., a signal generator can be doubled by making use of the Hall effect.

It is an object of the present invention to provide a frequency doubler having a simple circuitry.

Another object of the present invention is to provide a frequency doubler without the use of electron tubes in the doubler circuit so that the doubler circuit may be incorporated into instruments subject to shock or strain.

The invention also contemplates providing a frequency doubler circuit which can itself be doubled thereby raising the frequency with successive doubler stages.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention. Furthermore, other objects and advantages will become apparent from the following description taken in conjunction with the accompanying drawing in which:

Figure 2:
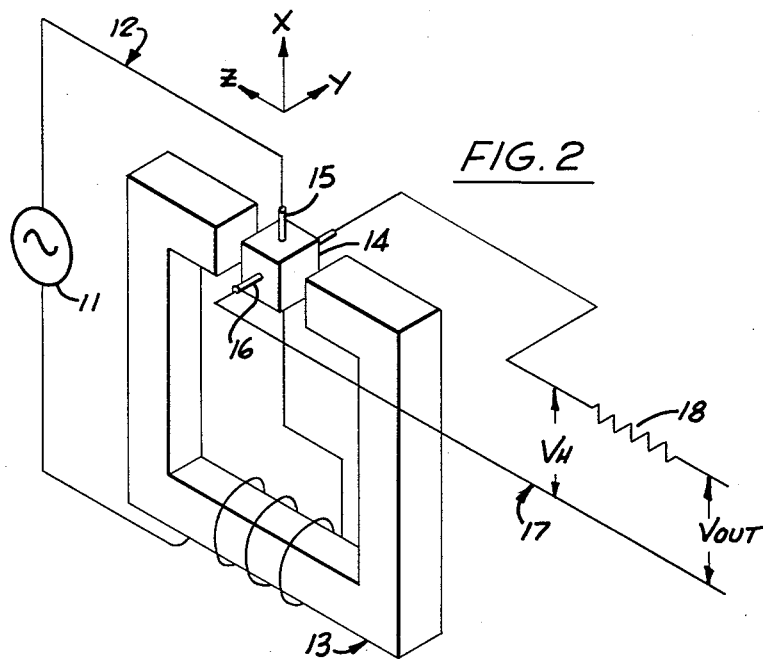
FIGURE 2 is a drawing showing details of construction of the components depicted in FIGURE 1.
Figure 1:
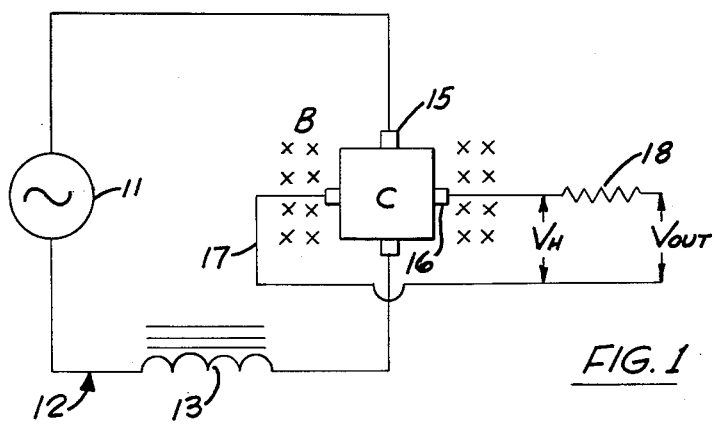
FIGURE 1 is a schematic diagram explaining the theory of operation of the device.

Generally speaking, the present invention contemplates doubling a given frequency by connecting control current terminals of a crystal in series with the coils of an electromagnet; the source of the electrical supply, e.g., signal generator being at the frequency which is to be doubled. The crystal is placed in such a manner that the current through the crystal will flow in a direction which is perpendicular to the direction of the magnetic field. Output terminals provided in the crystal are in turn perpendicular to both the direction of current flow through the crystal and the direction of the magnetic field. The voltage from the output terminals of the crystal will, when dropped through a given resistance be at a frequency which is double the input frequency.

In carrying the invention into practice, there is provided a signal generator 11 putting out an alternating current of fixed maximum current value and frequency. The output of this signal generator goes into circuit 12 at this fixed frequency which it is desired to double. In this circuit 12 is a horseshoe electromagnet 13 having its poles at the end of the horseshoe and connected in series with electromagnet 13 there is provided a crystal 14 having current control terminals 15. This crystal is advantageously made of indium arsenide or indium antimonide and so disposed in the horseshoe of electromagnet 13 that the magnetic field B extending in the direction $y$ is perpendicular to the direction of current flow $x$ through control terminals 15 of the crystal. Likewise, output terminals 16 are provided in the crystal at right angles to both the $y$ and $x$ axes producing a Hall effect voltage along axis $z$. The use of the letters $x$, $y$ and $z$ to designate the direction of the control current $I_x$, the magnetic field $B_y$ and the Hall voltage $V_{Hz}$ is conventional. In general, the Hall voltage $V_H$ may be written as (1) $$V_H = \frac{10^{-8} R_H I_x B_y}{d}$$

(Shive, The Properties, Physics, and Design of Semiconductor Devices, D. Van Nostrand Co., Princeton, 1959.)

Where $d$ is the thickness of the crystal parallel to B field; $R_H$ is the Hall coefficient, and B is the flux density in Gauss.

The Hall voltage $V_H$ from the output terminal 16 which is fed to circuit 17 having a resistance 18 of a certain given value will be at a frequency which is double the input frequency N of signal generator 11. The reasons for this will appear more clearly from a study of the following mathematical explanation.

It is apparent that for any given crystal held in a fixed position the thickness of the crystal parallel to the B field, and the Hall coefficient $R_H$ are constant. Therefore, in the above Formula 1 let $$\frac{10^{-8} R_H}{d} = \text{constant } k$$

so that the formula reads (2) $\quad V_H = k I_x B_y$ or simply $V_H = kIB$

In any alternating current, the instantaneous current or voltage may be expressed as follows:

(3) $\quad\quad I = I_0 \times \cos wt$
$\quad\quad\quad E = E_0 \times \cos wt$ where $w = 2\pi f$ and $t = $ time.

Since the source of the magnetic field B is from the same source as the control current to crystal 14, i.e., crystal 14 is in series with electromagnet 13, the flux density B will vary with E and I; then, (4) $\quad\quad B = B_0 \times \cos wt$ By replacing the values of I and B in Hall Formula 2 with the instantaneous values of current and magnetic field written in Equations 3 and 4 we arrive at (2) $\quad V_H = kIB$
$\quad\quad\quad = k(I_0 \cos wt)(B_0 \cos wt)$
(5) $\quad\quad\quad = k I_0 B_0 (\cos^2 wt)$ However, it is also shown in any standard textbook listing trigonometric formulae (Oberg et al. Machinery's Handbook, 10th ed., N.Y. Ind. Press, 1941, p. 173) that $\cos 2wt = 2 \cos^2 wt - 1$. Therefore, $$\cos^2 wt = \frac{1 + \cos 2wt}{2}$$

or, the above Formula 5 can be written as (6) $V_H = \frac{kI_oB_o}{2}(1 + \cos 2wt) = \frac{kI_oB_o}{2} + \frac{kI_oB_o}{2} \times \cos 2wt$ It is clear from the above that the instantaneous $V_H$ is composed of a D.C. component caused solely by the Hall effect and an A.C. component alternating at twice the initial frequency, i.e., $$\frac{kI_oB_o}{2} \text{ and } \frac{kI_oB_o}{2} \times \cos 2wt$$

If the first part of the formula, i.e., the D.C. component can be blocked out or dropped across a resistor, then only the remaining part of the formula i.e., the $\cos 2 wt$ component which is double the initial frequency will remain. The ohmic value R of resistor 18 required to drop out the undesired components is then arrived at as follows:

$$RI_o = \frac{kB_oI_o}{2}$$

(7) $R = \frac{1}{2}kB_o$

It is to be observed therefore that the present invention provides for a frequency doubler which among the other components, comprises a signal generator adapted to generate an alternating current of constant amplitude and frequency; an electromagnet in series with said generator, of horseshoe shape, setting up an alternating magnetic field between its poles at the end of the horseshoe when said alternating current is generated; a semiconductor, i.e., a crystal preferably made of indium arsenide or indium antimonide and of elongated rectangular shape, set between the poles of said electromagnet; a pair of control terminals on each side of said semiconductor, each control terminal being directly opposite the other, said control terminals being perpendicular to the direction of said magnetic field and connected in series with the field windings of said electromagnet; a pair of output terminals on each side of said semiconductor, each output terminal being directly opposite the other, said output terminals being perpendicular to both said control terminals, and the direction of said magnetic field, so that said output terminals will be at alternating different potentials with respect to each other because of the creation of a Hall voltage drop between said terminals, said potential difference or voltage drop having a component caused solely by the Hall effect, i.e., $\frac{1}{2}kI_oB_o$; and, a component caused by the alternating magnetic field, i.e., $$\frac{1}{2}kI_oB_o \times \cos 2wt$$

the alternating variation of said Hall voltage being at a frequency which is twice the frequency put out by said signal generator; and, a resistance in series with one of said output terminals whose ohmic value is such as to substantially eliminate the component in the voltage drop caused solely by the Hall effect.

It is further to be observed that the ohmic value of said resistance is equal to $\frac{1}{2}kB_o$ where $k$ is a constant equal to $$\frac{R_H 10^{-8}}{d}$$

$R_H$ being the Hall coefficient for the particular crystal $d$ being the thickness of the crystal parallel to the magnetic field, and, $B_o$ is the maximum flux density of the magnetic field around said crystal.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A frequency doubler, comprising, in combination; a signal generator adapted to generate an alternating current of constant amplitude and frequency; an electromagnet including field windings in series with said generator, of horseshoe shape, setting up an alternating magnetic field between its poles at the end of the horseshoe when said alternating current is generated, a semiconductor set between the poles of said electromagnet; a pair of control terminals on each side of said semiconductor, each control terminal being directly opposite the other, said control terminals being perpendicular to the direction of said magnetic field and connected in series with the field windings of said electromagnet; a pair of output terminals on each side of said semiconductor, each output terminal being directly opposite the other, said output terminals being perpendicular to both said control terminals, and the direction of said magnetic field, so that said output terminals will be at different alternating potentials with respect to each other, said potential difference being caused by the Hall effect, and by the alternating magnetic field, the alternating variation of said voltage being at a frequency which is twice the frequency put out by said signal generator; and, a resistance in series with said output terminals whose ohmic value is equal to $\frac{1}{2}kB_o$ where $k$ is a constant equal to

$$\frac{R_H 10^{-8}}{d}$$

$R_H$ being the Hall coefficient for the particular semiconductor, $d$ being the thickness of the semiconductor parallel to the magnetic field, and $B_o$ is the maximum flux density of the magnetic field around said semiconductor.

2. A frequency doubler, comprising, in combination; a signal generator adapted to generate an alternating current of constant amplitude and frequency; an electromagnet including field windings in series with said generator, of horseshoe shape, setting up an alternating magnetic field between its poles at the end of the horseshoe when said alternating current is generated; a crystal semiconductor set between the poles of said electromagnet; a pair of control terminals being directly opposite the other, said control terminals being perpendicular to the direction of said magnetic field and connected in series with the field windings of said electromagnet; a pair of output terminals on each side of said crystal, each output terminal being directly opposite the other, said output terminals being perpendicular to both said control terminals, and the direction of said magnetic field, so that said output terminals will be alternating at different potentials with respect to each other, said potential difference being caused by the Hall effect, and by the alternating magnetic field, the alternating variation of said Hall voltage being at a frequency which is twice the frequency put out by said signal generator; and, a resistance in series with said output terminals whose ohmic value is equal to $\frac{1}{2}kB_o$ where $k$ is a constant equal to $$\frac{R_H 10^{-8}}{d}$$

$R_H$ being the Hall coefficient for the particular semiconductor, $d$ being the thickness of the semiconductor parallel to the magnetic field, and $B_o$ is the maximum flux density of the magnetic field around said semiconductor.

3. A device as claimed in claim 2 said crystal being an indium arsonide crystal.

4. A device as claimed in claim 2 said crystal being an indium antimonide crystal.

References Cited in the file of this patent
UNITED STATES PATENTS

| | | |
|---|---|---|
| 2,536,806 | Hansen | Jan. 2, 1951 |
| 2,830,251 | Tiley | Apr. 8, 1958 |
| 2,924,775 | Neugebauer | Feb. 9, 1960 |